United States Patent
Lee et al.

(10) Patent No.: US 12,315,128 B2
(45) Date of Patent: May 27, 2025

(54) METHOD FOR DETECTING APPEARANCE DEFECTS OF A PRODUCT AND ELECTRONIC DEVICE

(71) Applicant: HON HAI PRECISION INDUSTRY CO., LTD., New Taipei (TW)

(72) Inventors: Wan-Jhen Lee, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 483 days.

(21) Appl. No.: 17/859,182

(22) Filed: Jul. 7, 2022

(65) Prior Publication Data

US 2023/0214981 A1    Jul. 6, 2023

(30) Foreign Application Priority Data

Dec. 31, 2021   (CN) .......................... 202111663832.8

(51) Int. Cl.
    *G06T 7/00*            (2017.01)
    *G06V 10/75*          (2022.01)

(52) U.S. Cl.
    CPC .............. *G06T 7/0004* (2013.01); *G06T 7/97* (2017.01); *G06V 10/751* (2022.01)

(58) Field of Classification Search
    CPC ........ G06T 7/0004; G06T 7/97; G06V 10/751
    USPC .......................................................... 382/133
    See application file for complete search history.

(56) References Cited

PUBLICATIONS

Painchaud, Nathan, et al. "Cardiac segmentation with strong anatomical guarantees." IEEE transactions on medical imaging 39.11 (2020): 3703-3713. (Year: 2020).*
Liu, Jie, et al. "Semi-supervised anomaly detection with dual prototypes autoencoder for industrial surface inspection." Optics and Lasers in Engineering 136 (2021): 106324. (Year: 2021).*
Zebari, Dilovan Asaad, et al. "Improved threshold based and trainable fully automated segmentation for breast cancer boundary and pectoral muscle in mammogram images." Ieee Access 8 (2020): 203097-203116. (Year: 2020).*
Feng, Deshan, et al. "Deep convolutional denoising autoencoders with network structure optimization for the high-fidelity attenuation of random GPR noise." Remote Sensing 13.9 (2021): 1761. (Year: 2021).*

* cited by examiner

*Primary Examiner* — Jonathan S Lee
(74) *Attorney, Agent, or Firm* — ScienBiziP, P.C.

(57) ABSTRACT

A method for detecting defects in appearance of a product from images thereof, applied in an electronic device, obtains positive sample images, negative sample images, and product sample images, divides the product sample images into input image blocks, and inputs the input image blocks into a pre-trained autoencoder to obtain reconstructed image blocks. The electronic device determines corresponding pixel points in the input image blocks, and corresponding pixel difference values, and generates feature connection regions of each input image block according to the positive sample images and the pixel difference values. The electronic device generates a first threshold, selects target regions from the feature connection regions and the first threshold, and generates a second threshold. The electronic device further determines a detection result of a product sample in the product sample image according to an area of the target area and the second threshold.

20 Claims, 4 Drawing Sheets

METHOD FOR DETECTING APPEARANCE DEFECTS OF A PRODUCT AND ELECTRONIC DEVICE

This application claims priority to Chinese Patent Application No. 202111663832.8 filed on Dec. 31, 2021, in China National Intellectual Property Administration, the contents of which are incorporated by reference herein.

FIELD

The subject matter herein generally relates to a field of image processing, in particular, relates to a method for detecting appearance defects of a product and an electronic device.

BACKGROUND

In a method for detecting defects in appearance of a product, zooming an image of a product will change the number of pixels in the product image, thus, the zoomed image will lose some image details. As a result, an accuracy of the method for detecting product appearance is not high.

BRIEF DESCRIPTION OF THE DRAWINGS

Implementations of the present disclosure will now be described, by way of embodiment, with reference to the attached figures.

DETAILED DESCRIPTION

Figure 1:
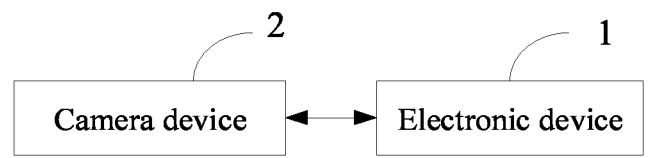
FIG. 1 is an application environment diagram of a method for detecting appearance defect of product according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates an application environment of a method for detecting appearance defect of product. A camera device 2 is connected to an electronic device 1, and the camera device 2 can be a camera or other image-capturing device.

Figure 2:
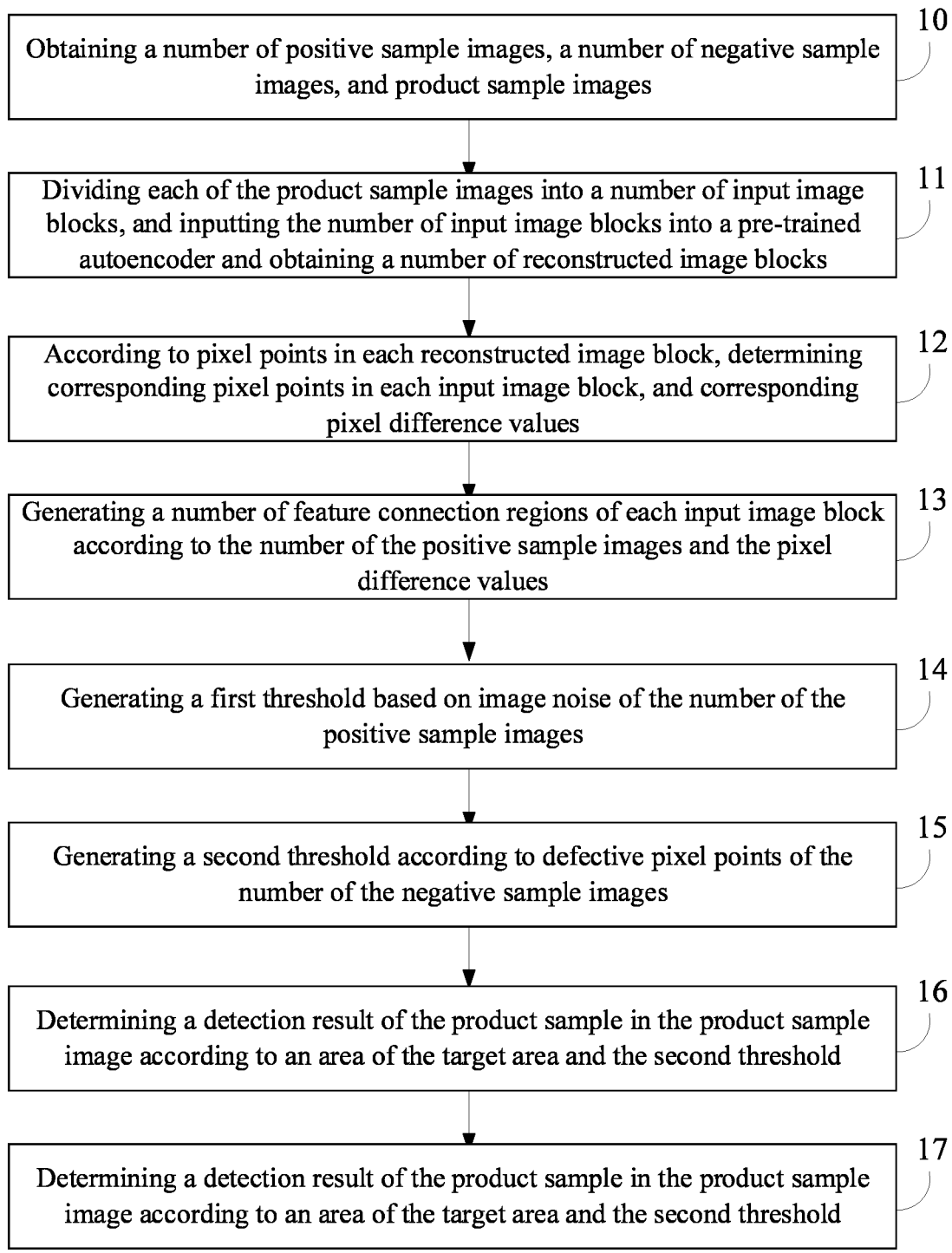
FIG. 2 is a flowchart of one embodiment of the method for detecting appearance defect of product according to an embodiment of the present disclosure.

FIG. 2 illustrates the method. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 10.

In one embodiment, the method is applied to one or more electronic devices 1. The electronic device 1 is a device that can automatically perform numerical calculation and/or information processing according to pre-set or stored instructions. The hardware of the electronic device 1 includes, but is not limited to a microprocessor, an Application Specific Integrated Circuit (ASIC), a Programmable Gate Array (FPGA), a Digital Signal Processor (DSP), an embedded equipment, etc.

In one embodiment, the electronic device 1 can be any electronic product that can interact with a user, such as a personal computer, a tablet computer, a smart phone, a Personal Digital Assistant (PDA), a game console, and an Internet Protocol Television (IPTV), a smart wearable device, etc.

In one embodiment, the electronic device 1 may also include a network equipment and/or user equipment. The network device includes, but is not limited to, a single network server, a server group consisting of multiple network servers, or a computing cloud consisting of a large number of hosts or network servers.

In one embodiment, the network used by the electronic device 1 includes, but is not limited to the Internet, a wide area network, a metropolitan area network, a local area network, a Virtual Private Network (VPN), etc.

At block 10, obtaining a number of positive sample images, a number of negative sample images, and product sample images.

In one embodiment, the samples in each positive sample image have no appearance defects of a product. For example, the samples in each positive sample image may be mobile phone cases with no appearance defects, and the number of the positive sample images may represent images with no appearance defects of the product. The number of the positive sample images can be used to calculate a color difference threshold and a first threshold, and a corresponding calculation process will be described in detail below.

In one embodiment, the samples in the negative sample images are images of products with defects in appearance, and the number of negative sample images may represent appearance defect images of the product. The number of negative sample images can be used to calculate a second threshold, and a corresponding calculation process will be described in detail below.

In one embodiment, the product sample images refer to the images of the sample to be tested. By using the method for detecting appearance defect of the product, it can be determined whether a product sample in the product sample images is an appearance defect sample of the product or a product appearance sample without defects by identification and detection of the product sample images.

In one embodiment, the electronic device controls the camera to shoot a number of positive samples, negative samples and product samples at the same position and angle to obtain the number of the positive sample images, the number of the negative sample images, and the product sample images. The multiple positive sample images, the multiple negative sample images, and the product sample images have the same size.

At block 11, dividing each of the product sample images into a number of input image blocks, and inputting the number of input image blocks into a pre-trained autoencoder and obtaining a number of reconstructed image blocks.

In one embodiment, the autoencoder includes an encoder and a decoder. The encoder includes a number of hidden layers, and the decoder includes a number of operation layers.

In one embodiment, the number of input image blocks refer to image blocks obtained by dividing the product sample images according to a preset size. The preset size can be set according to user requirements, which is not limited in this application.

In one embodiment, the number of the reconstructed image blocks refer to image blocks that are restored by the autoencoder according to the number of input image blocks and are similar to the input image blocks.

In one embodiment, when dividing the product sample image into a number of input image blocks, since the product sample image does not need to be zoomed, the loss of image details does not occur, and the detection accuracy of the product sample image can be improved.

In one embodiment, the dividing of each of the product sample images into a number of input image blocks, and inputting the number of input image blocks into a pre-trained autoencoder and obtaining a number of reconstructed image blocks includes: the electronic device encoding each of the input image blocks and obtaining a feature vector of each of the input image blocks, and calculating each feature vector by the encoder of the autoencoder, and obtaining a number of latent vectors of the number of input images, inputting the number of the latent vectors to the decoder of the autoencoder for reconstruction processing to obtain the number of the reconstructed image blocks.

In one embodiment, calculating each feature vector by the encoder of the autoencoder, and obtaining a number of latent vectors of the number of input images includes: the electronic device obtaining a first weight matrix and a first bias value of a number of hidden layers, and multiplying each feature vector with the first weight matrix of first hidden layer of the number of hidden layers to obtain an operation result, adding the operation result to the first bias value to obtain the output vector of the first hidden layer, and determining the output vector of the first hidden layer as an input vector of next hidden layer of the number of hidden layers, until all of the hidden layers are completed, and obtaining the output vector of last hidden layer. Further, the electronic device determines the output vector of the last hidden layer as the latent vector of each input image block, and obtains the latent vectors of the number of input image block.

By the above-described embodiments, the number of input image blocks can be compressed or processed into latent vectors.

In one embodiment, inputting the number of latent vectors to the decoder of the autoencoder for reconstruction processing to obtain the number of reconstructed image blocks includes: the electronic device obtaining a second weight matrix and the second bias value of the number of operation layers, and multiplying each latent vector with the second weight matrix of the first operation layer to obtain a multiplication result, adding the multiplication result to the second bias value to obtain the feature vector of the first operation layer, and determining the feature vector of the first operation layer as the input vector of the next operation layer, until all of the number of the operation layers are completed, and obtaining the feature vector of the last operation layer. Further, the feature vector of the last operation layer is reconstructed into image blocks, and the number of the reconstructed image blocks of the number of the input image blocks is obtained.

By the above-described embodiments, the electronic device can quickly relate the number of the latent vectors to the number of the reconstructed image blocks.

In one embodiment, the method further includes: training the autoencoder. In one embodiment, training the autoencoder includes: dividing each positive sample image into the number of the positive sample image blocks according to the preset size, and inputting the number of the positive sample image blocks into a learner for training, and obtaining the pre-trained image after the training of the autoencoder reaches convergence.

At block 12, according to pixel points in each reconstructed image block, determining the corresponding pixel points in each input image block, and corresponding pixel difference values.

In one embodiment, the pixel difference value refers to value of a difference between the pixel value of the pixel point in each reconstructed image block and the pixel value of the pixel point in each input image block. The pixel difference value is used to represent the difference value between the pixel values of two corresponding pixel points.

In one embodiment, determining corresponding pixel point in each input image block and corresponding pixel difference value includes: obtaining the pixel value of the pixel point in each reconstructed image block as a target pixel value, and obtaining the pixel value of the corresponding pixel point in each input image block as a characteristic pixel value, and calculating the difference value between the target pixel value and the characteristic pixel value to obtain the pixel difference value.

By the above-described processes, the difference value between the pixel values of each reconstructed image block and the corresponding pixel of each input image block can be obtained. According to the pixel difference value, a preliminary determination can be made as to whether each reconstructed image block is similar to the corresponding input image block.

At block 13, generating a number of feature connection regions of each input image block according to the number of the positive sample images and the pixel difference values.

In one embodiment, the number of the feature connection regions refers to regions which are connected by adjacent target pixels in each input image block. The target pixel point refers to the pixel point corresponding to the pixel difference value greater than a color difference threshold in each input image block.

In one embodiment, the electronic device subtracts the pixel values of the pixel points in any two positive sample image blocks and obtains color difference values, and counts the number of the pixel points having the same color difference value in the number of positive sample image blocks. Further, the electronic device determines the color difference value as an abscissa, and determines the number of the pixel points corresponding to the color difference value as an ordinate, and generates a color difference histogram according to the abscissa and the ordinate. Further, the electronic device selects a number of continuous color difference values from coordinate values of the color difference histogram according to a preset value, and determines the continuous color difference values that are continuous with each other as a same feature set to obtain a number of feature sets, and then counts a number of elements in each feature set, and determines the feature set with the largest number of elements as a target color difference value set. Further, the electronic device selects a maximum color difference value from the target color difference value set as a color difference threshold value, determines the pixel difference value less than or equal to the color difference threshold value as a background difference value, and selects the pixel points corresponding to the background difference value from each input image block as background pixel points, and determines the pixel difference value greater than the color difference threshold as the target difference value, and selects the pixel points corresponding to the target difference value from each input image block, and the pixel points corresponding to the target difference value are taken as the target pixel points. Finally, the electronic device generates the feature connection regions according to adjacent target pixel points, and the background pixel points are located between any two feature connection regions.

In one embodiment, the preset value can be set by user needs, which is not limited in this application.

In one embodiment, the continuous color difference value means that an ordinate value is smaller than an abscissa value corresponding to the preset value.

In one embodiment, the pixel points in each input image block include target pixel points and background pixel points.

By the above-described processes, the maximum color difference value of the background pixel points in the number of the positive sample image blocks can be obtained, and by the color difference threshold, the number of the feature connection regions with defects can be filtered out from each input image block.

In one embodiment, the electronic device compares each ordinate value with the preset value. When the ordinate value is greater than or equal to the preset value, the electronic device selects the abscissa value corresponding to the ordinate value and obtains a number of continuous color difference values. Further, the electronic device determines the continuous color difference values that are continuous with each other as the same feature set, and obtains a number of the feature sets.

For example, when the preset value is 0, the number of the pixel points corresponding to the color difference value of 0 in the color difference histogram is 2; the number of the pixel points corresponding to the color difference value of 1 is 3; the number of the pixel points corresponding to the color difference value of 2 is 4; the number of the pixel points corresponding to the color difference value of 3 is 5; the number of pixel points corresponding to the color difference value of 4 is 2; the number of the pixel points corresponding to the color difference value of 5 is 3; the number of the pixel points corresponding to the color difference value of 6 is 0; and the number of the pixel points corresponding to the color difference value of 7 is 1; the number of the pixel points corresponding to the color difference value of 8 is the number of the pixel points corresponding to the color difference value of 9 is 2; and the number of the pixel points corresponding to the color difference value of 10 is 0. Feature set A {color difference value of 0, color difference value of 1, color difference value of 2, color difference value of 3, color difference value of 4, color difference value of 5}, and feature set B {color difference value of 7, color difference value of 8, color difference value of 9} can be obtained. The number of elements contained in the feature set A is greater than the number of elements contained in the feature set B, so the feature set A is the target color difference value set, and the largest color difference value 5 in the feature set A is determined as being the color difference threshold.

Figure 3:
FIG. 3 is a schematic diagram showing generation of feature connection regions.

FIG. 3 illustrates the generating of feature connection regions. In one embodiment, the color difference threshold is 5. When the pixel difference value is greater than the color difference threshold value of 5, the pixel difference value is determined as the target difference value, and the pixel point of the target difference value in each input image block is determined as the target pixel point, and the target pixel point is marked as "1". When the pixel difference value is less than or equal to the color difference threshold 5, the pixel difference value is determined as the background difference value, the pixel point of the background difference value in each input image block is determined as the background pixel point, and the background pixels are marked as "0". In this way, in each input image block, the target pixel point is distinguished from the background pixel point, and the adjacent target pixel points generate the feature connected regions, and the background pixel pints are located between any two feature connected regions.

In one embodiment, the electronic device marks the background pixel points in each input image block with "0", marks the target pixel point in each input image block with "1", and the target pixel point and the background pixel point are thus distinguished. Thus, the number of the feature connection regions in each input image block are accurately filtered out.

At block 14, generating a first threshold based on image noise of the number of the positive sample images.

In one embodiment, the image noise includes, but is not limited to slight color difference, and background noise generated when the product sample image is generated.

In one embodiment, generating the first threshold based on image noise of the number of the positive sample images includes: determining the feature sets except the target color difference value set as background color difference value sets, and selecting the pixel points corresponding to color difference values from the number of the positive sample image blocks and regarding filtered pixel points as noise pixel points. Further, the electronic device generates a number of the first connection regions according to adjacent noise pixel points, and counts a number of the noise pixels in each first connection region to obtain the image noise, and selects the image noise having the largest value as the first threshold.

By the above-described processes, the greatest image noise in the number of the positive sample image blocks can be filtered out, and the greatest image noise can be used as the first threshold, and the target area can be filtered out from the number of the feature connection areas by the first threshold.

At block 15, generating a second threshold according to defective pixel points of the number of the negative sample images.

In one embodiment, the second threshold refers to minimum area of a defective area, and the defective area refers to an area in which the number of defective pixel points is greater than the first threshold. Further, the defective area includes a number of adjacent defective pixels.

In one embodiment, the electronic device divides each negative sample image into a number of negative sample image blocks according to the preset size, and obtains the first pixel value of each negative sample image block, and obtains the second pixel value of each positive sample image block, calculates the difference value between the first pixel value and the second pixel value, and obtains the negative sample difference value. Further, the electronic device determines the negative sample difference value which is less than or equal to the color difference threshold as the characteristic difference value, selects the pixel points corresponding to the characteristic difference value from each negative sample image block as the characteristic pixel point, and determines the negative sample difference value which is greater than the color difference threshold as the defect difference value, and selects the pixel points corresponding to the defect difference value from each negative sample image block as the defective pixel points. Further, the electronic device generates a number of second connection regions according to the adjacent defective pixel points, and the characteristic pixel points are located between any two second connected regions. The electronic device counts the number of pixels in each second connection region to obtain a second number. The electronic device further determines the second connection area corresponding to the second number which is greater than the first threshold as a defect area. The electronic device calculates an area of the defect area according to all of the pixel points in the defect area and obtains the first defect area, and selects the minimum value of the first defect area as the second threshold.

In one embodiment, the pixels in each negative sample image block include feature pixel points and defective pixel points. The feature pixel points are located between any two second connection regions.

In one embodiment, each defective pixel point refers to a pixel point corresponding to the defective difference value in the number of negative sample image blocks. The second connection region refers to the region generated by adjacent defective pixel points in each negative sample image block.

By the above-described processes, according to the color difference threshold and the first threshold, the minimum area of the defect area in the number of the negative sample image blocks can be accurately obtained, and the second threshold can be used to accurately filter out the target area greater than the minimum value from each input image block.

At block 16, selecting target regions from the number of feature connection regions according to the number of pixel points in each feature connection region and the first threshold.

In one embodiment, the target area refers to the feature connection area in which the number of the pixel points is greater than the first threshold. For example, the first threshold is 5, the number of the pixel points included in the feature connection region A is 4, the number of the pixel points included in the feature connection region B is 6, and the number of the pixel points included in the feature connection region C is 8. Therefore, the feature connection regions B and C are both target regions.

In one embodiment, selecting target regions from the number of feature connection regions according to the number of pixel points in each feature connection region and the first threshold includes: counting the number of the pixel points in each feature connection region, obtaining a first number, and determining the feature connection region corresponding to the first number greater than the first threshold as being the target region.

By the above-described processes, selecting the target area from the number of the feature connection areas can further determine a reasonable error in the product sample image and improve the detection accuracy of the product sample image.

At block 17, determining a detection result of the product sample in the product sample image according to an area of the target area and the second threshold.

In one embodiment, the detection result includes the product sample in the product sample image being a defect sample of product appearance and a position of the defect in the product sample image, or that the product sample in the product sample image is a product appearance sample without defect.

In one embodiment, the electronic device calculates the area of the target area according to all of the pixel points in the target area and obtains a second defect area. The electronic device determines the input image block corresponding to the second defect area that is larger than the second threshold as a defective sample block, and when there is at least one of the defective sample blocks in the number of the input image blocks, the electronic device determines that the product sample is a product appearance defect sample, and determines the defect position according to the position of the defective sample block in the product sample image. The electronic device determines the sample of the product with defective appearance as being defective product and the position of the defect as the detection result.

In one embodiment, the method further includes: when a defective sample block does not exist in the number of the input image blocks, determining the detection result as being that the product sample is the product appearance sample without defect.

By the above-described processes, the detection result of the product sample in the product sample image can be accurately obtained.

In one embodiment, the method further regards the product sample image as a known product sample image, and detects the product sample image to be tested for product appearance defect detection.

In one embodiment, when the product sample is determined to be a non-defective product appearance, the product sample image is a non-defective product appearance image, and the non-defective product appearance image can be used as a positive sample image to detect the product sample image to be tested. When the product sample is a product appearance defect sample, the product sample image is a product appearance defect image, and the product appearance defect image can be used as a negative sample image to detect the product sample image to be tested.

The present application inputs the number of the positive sample image blocks obtained by segmentation into the autoencoder for training. Since the present application does not need to scale the product sample image, loss of image details in the product sample image is avoided. The first threshold is further calculated by the number of the positive sample image blocks, and the target area is filtered out from the product sample image according to the first threshold. Since the target area contains a certain reasonable error, the second threshold being determined in combination with the defective pixel points in the number of the negative sample image blocks avoids the influence of the reasonable errors in the product sample image on the detection of product appearance defects, thus the detection accuracy of the product sample image can be improved.

Figure 4:
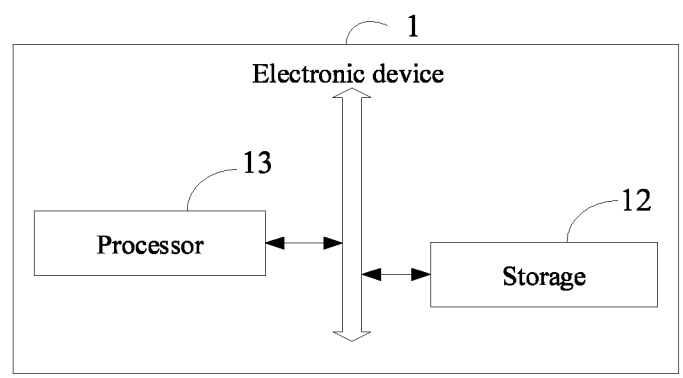
FIG. 4 is a schematic diagram of one embodiment of an electronic device according to an embodiment of the present disclosure.

FIG. 4 illustrates the electronic device 1. The electronic device 1 includes a storage 12, a processor 13, and computer program stored in the storage 12 and executed by the processor 13.

Those skilled in the art can understand that the schematic diagram shown in FIG. 4 is only an example of the electronic device 1, and does not constitute a limitation on the electronic device 1, other examples may include more or less components than those shown in the drawings, or may have different combinations of components, or different components, for example, the electronic device 1 may also include input and output devices, network access devices, and the like.

The at least one processor 13 may be a Central Processing Unit (CPU), and may also be a general-purpose processor, a Digital Signal Processors (DSP), an Application Specific Integrated Circuit (ASIC), a Field-Programmable Gate Array (FPGA) or other programmable logic devices, discrete gate or transistor logic devices, discrete hardware components, etc. The at least one processor 13 can be a microprocessor or the at least one processor 13 can also be any conventional processor, etc. The at least one processor 13 is the control center of the electronic device 1, using various interfaces and lines to connect various parts of the entire electronic device 1. The at least one processor 13 obtains the operating system of the electronic device 1 and various installed applications, program codes, and the like. For example, the processor 13 may acquire the number of the positive sample images captured by the camera 2 by an interface.

The processor 13 acquires the operating system of the electronic device 1 and various applications. The processor 13 acquires the application program to implement the blocks in each of the foregoing embodiments of the method for detecting appearance defect of product, for example, the blocks shown in FIG. 2.

Exemplarily, the computer program can be divided into one or more modules/units, and the one or more modules/units are stored in the storage 12 and retrieved by the processor 13 to complete the present application. The one or more modules/units may be a series of computer program instruction segments capable of completing specific functions, and the instruction segments are used to describe the acquisition process of the computer program in the electronic device 1.

The storage 12 can be used to store the computer program, and the at least one processor 12 implements the electronic program by executing the computer program stored in the storage 12 and calling up the data stored in the storage 12. The storage 12 may include a stored program area and a stored data area, wherein the stored program area may store an operating system, an application program required for at least one function (such as a sound playback function, an image playback function, etc.), etc. The storage data area may store data (such as audio data) created according to the use of the electronic device 1, etc. In addition, the storage 12 may include non-volatile storage such as a hard disk, an internal memory, a plug-in hard disk, a Smart Media Card (SMC), a Secure Digital (SD) card, a Flash Card (Flash Card), at least one disk storage device, flash memory device, or other non-volatile solid state storage device.

In one embodiment, the storage 12 may be an external memory and/or an internal memory of the electronic device 1. Further, the storage 12 may be a storage in physical form, such as a memory stick, a Trans-flash Card, and the like.

In one embodiment, the modules/units integrated in the electronic device 1 can be stored in a computer readable storage medium if such modules/units are implemented in the form of an independent product. Thus, the present disclosure may be implemented and realized in any part of the method of the foregoing, embodiments, or may be implemented by the computer program, which may be stored in the computer readable storage medium. The blocks of the various method embodiments described above may be implemented by a computer program when executed by a processor.

The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), random access memory (RAM), electrical carrier signals, telecommunication signals, and software distribution media.

With reference to FIG. 2, the storage 12 in the electronic device 1 stores a number of instructions to implement a method for detecting appearance defect of product, and the processor 13 can acquire the number of instructions to implement: acquiring a number of the positive sample images, a number of the negative sample images and product sample images; dividing the product sample image into a number of input image blocks, and inputting the number of the input image blocks into the pre-trained autoencoder to obtain a number of the reconstructions image blocks; based on the pixel points in each reconstructed image block, determining the corresponding pixel points in each input image block and the corresponding pixel difference value: generating a number of feature connection regions of each input image block according to the number of the positive sample images and the pixel difference values; generating the first threshold based on the image noise of the number of the positive sample images; selecting the target regions from the number of the feature connection regions according to the number of pixel points in each feature connection region and the first threshold; generating a second threshold according to the defective pixel points of the number of the negative sample images; and determining the detection result of the product sample in the product sample image according to the area of the target area and the second threshold.

Specifically, for the specific implementation method of the above-mentioned instruction by the processor 13, reference may be made to the description of the relevant blocks in the embodiment corresponding to FIG. 2.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A method for detecting appearance defects of a product comprising:
   obtaining positive sample images, negative sample images, and product sample images;
   dividing each of the product sample images into input image blocks, and inputting the input image blocks into a pre-trained autoencoder and obtaining reconstructed image blocks;
   according to pixel points in each of the reconstructed image blocks, determining corresponding pixel points in each of the input image blocks, and determining corresponding pixel difference values;
   generating feature connection regions of each of the input image blocks according to the positive sample images and the pixel difference values;
   generating a first threshold based on image noise of the positive sample images;
   selecting target regions from the feature connection regions according to a number of pixel points in each of the feature connection regions, and the first threshold;
   generating a second threshold according to defective pixel points of the negative sample images;
   determining a detection result of a product sample in the product sample image according to an area of the target regions and the second threshold.

2. The method as claimed in claim 1, further comprising:
   encoding each of the input image blocks and obtaining a feature vector of each of the input image blocks;
   calculating each feature vector by an encoder of the autoencoder, and obtaining latent vectors of the input images;
   inputting the latent vectors to a decoder of the autoencoder for a reconstruction processing, and obtaining the reconstructed image blocks.

3. The method as claimed in claim 1, further comprising:
   subtracting the pixel values of the pixel points in any two positive sample image blocks and obtaining color difference values;
   counting a number of the pixel points having the same color difference value in the positive sample image blocks;
   determining one color difference value as an abscissa, and determining the number of the pixel points corresponding to the color difference value as an ordinate, and generating a color difference histogram according to the abscissa and the ordinate;
   selecting continuous color difference values from coordinate values of the color difference histogram according to a preset value, and determining continuous color difference values that are continuous with each other as a same feature set to obtain feature sets;
   counting a number of elements in each of the feature sets, and determining one feature set having a maximum number of the elements as a target color difference value set;
   selecting a maximum color difference value from the target color difference value set as a color difference threshold value;
   determining the pixel difference value greater than the color difference threshold value as a target difference value, and selecting the pixel points corresponding to the target difference value from each of input image blocks, and taking the pixel points corresponding to the target difference value as target pixel points, generating the feature connection regions according to adjacent target pixel points;
   determining one pixel difference value less than or equal to the color difference threshold value as background difference value, and selecting pixel points corresponding to the background difference value from each of input image blocks as background pixel points, the background pixel points being located between any two feature connection regions.

4. The method as claimed in claim 3, further comprising:
   determining the feature sets except the target color difference value set as background color difference value sets;
   selecting the pixel points corresponding to color difference values from the positive sample image blocks and determining filtered pixel points as noise pixel points;
   generating first connection regions according to adjacent noise pixel points;
   counting a number of the noise pixels in each of the first connection regions, obtaining the image noise;
   selecting the image noise having a largest value as the first threshold.

5. The method as claimed in claim 3, further comprising:
   dividing each of the negative sample images into the negative sample image blocks according to a preset size;
   obtaining the first pixel value of each of the negative sample image blocks, and obtaining a second pixel value of each of the positive sample image blocks;
   calculating a difference value between the first pixel value and the second pixel value, and obtaining a negative sample difference value;
   determining a negative sample difference value greater than the color difference threshold as a defect difference value, and selecting the pixel points corresponding to the defect difference value from each of the negative sample image blocks as defective pixel points, generating the second connection regions according to the adjacent defective pixel points, and the characteristic pixel points being located between any two second connected regions;
   determining the negative sample difference value less than or equal to the color difference threshold as the characteristic difference value, selecting the pixel points corresponding to the characteristic difference value from each negative sample image block as the characteristic pixel points;
   counting the number of pixels in each of the second connection regions, and obtaining a second number;
   determining the second connection area corresponding to the second number greater than the first threshold as a defect area;
   calculating an area of the defect area according to all of the pixel points in the defect area, and obtaining a first defect area;
   selecting the minimum value of the first defect area as the second threshold.

6. The method as claimed in claim 1, further comprising:
   counting the number of the pixel points in each of the feature connection regions, obtaining a first number;
   determining the feature connection region corresponding to the first number greater than the first threshold as the target region.

7. The method as claimed in claim 1, further comprising:
calculating the area of the target regions according to all of the pixel points in the target regions and obtaining a second defect area;
determining the input image block corresponding to the second defect area that is larger than the second threshold as a defective sample block;
when there is at least one defective sample block in the input image blocks, determining the product sample as a defect sample of product appearance;
determining a defect position according to a position of the defective sample block in the product sample image;
determining the defect sample of the product appearance and the defect position as the detection result.

8. The method as claimed in claim 1, further comprising:
regarding the product sample image as a known product sample image, and detecting the product sample image to be tested for product appearance defect detection.

9. An electronic device comprising:
a processor; and
a non-transitory storage medium coupled to the processor and configured to store a plurality of instructions, which cause the processor to:
obtain positive sample images, negative sample images, and product sample images;
divide each of the product sample images into input image blocks, and input the input image blocks into a pre-trained autoencoder and obtain reconstructed image blocks;
according to pixel points in each of the reconstructed image blocks, determine corresponding pixel points in each of the input image blocks, and determine corresponding pixel difference values;
generate feature connection regions of each of the input image blocks according to the positive sample images and the pixel difference values;
generate a first threshold based on image noise of the positive sample images;
select target regions from the feature connection regions according to a number of pixel points in each of the feature connection regions, and the first threshold;
generate a second threshold according to defective pixel points of the negative sample images;
determine a detection result of a product sample in the product sample image according to an area of the target regions and the second threshold.

10. The electronic device as recited in claim 9, wherein the plurality of instructions are further configured to cause the processor to:
encode each of the input image blocks and obtain a feature vector of each of the input image blocks;
calculate each feature vector by an encoder of the autoencoder, and obtain latent vectors of the input images;
input the latent vectors to a decoder of the autoencoder for a reconstruction processing, and obtain the reconstructed image blocks.

11. The electronic device as recited in claim 9, wherein the plurality of instructions are further configured to cause the processor to:
subtract the pixel values of the pixel points in any two positive sample image blocks and obtain color difference values;
count a number of the pixel points having the same color difference value in the positive sample image blocks;
determine one color difference value as an abscissa, and determine the number of the pixel points corresponding to the color difference value as an ordinate, and generate a color difference histogram according to the abscissa and the ordinate;
select continuous color difference values from coordinate values of the color difference histogram according to a preset value, and determine continuous color difference values that are continuous with each other as a same feature set to obtain feature sets;
count a number of elements in each of the feature sets, and determine one feature set having a maximum number of the elements as a target color difference value set;
select a maximum color difference value from the target color difference value set as a color difference threshold value;
determine the pixel difference value greater than the color difference threshold value as a target difference value, and select the pixel points corresponding to the target difference value from each of input image blocks, and take the pixel points corresponding to the target difference value as target pixel points, generate the feature connection regions according to adjacent target pixel points;
determine one pixel difference value less than or equal to the color difference threshold value as background difference value, and select pixel points corresponding to the background difference value from each of input image blocks as background pixel points, the background pixel points being located between any two feature connection regions.

12. The electronic device as recited in claim 11, wherein the plurality of instructions are further configured to cause the processor to:
determine the feature sets except the target color difference value set as background color difference value sets;
select the pixel points corresponding to color difference values from the positive sample image blocks and determine filtered pixel points as noise pixel points;
generate first connection regions according to adjacent noise pixel points;
count a number of the noise pixels in each of the first connection regions, obtain the image noise;
select the image noise having a largest value as the first threshold.

13. The electronic device as recited in claim 11, wherein the plurality of instructions are further configured to cause the processor to:
divide each of the negative sample images into the negative sample image blocks according to a preset size;
obtain the first pixel value of each of the negative sample image blocks, and obtain a second pixel value of each of the positive sample image blocks;
calculate a difference value between the first pixel value and the second pixel value, and obtain a negative sample difference value;
determine a negative sample difference value greater than the color difference threshold as a defect difference value, and select the pixel points corresponding to the defect difference value from each of the negative sample image blocks as defective pixel points, generate the second connection regions according to the adjacent defective pixel points, and the characteristic pixel points being located between any two second connected regions;

determine the negative sample difference value less than or equal to the color difference threshold as the characteristic difference value, select the pixel points corresponding to the characteristic difference value from each negative sample image block as the characteristic pixel points;

count the number of pixels in each of the second connection regions, and obtain a second number;

determine the second connection area corresponding to the second number greater than the first threshold as a defect area;

calculate an area of the defect area according to all of the pixel points in the defect area, and obtain a first defect area;

select the minimum value of the first defect area as the second threshold.

14. The electronic device as recited in claim 9, wherein the plurality of instructions are further configured to cause the processor to:

count the number of the pixel points in each of the feature connection regions, obtain a first number;

determine the feature connection region corresponding to the first number greater than the first threshold as the target region.

15. The electronic device as recited in claim 9, wherein the plurality of instructions are further configured to cause the processor to:

calculate the area of the target regions according to all of the pixel points in the target regions and obtain a second defect area;

determine the input image block corresponding to the second defect area that is larger than the second threshold as a defective sample block;

when there is at least one defective sample block in the input image blocks, determine the product sample as a defect sample of product appearance;

determine a defect position according to a position of the defective sample block in the product sample image;

determine the defect sample of the product appearance and the defect position as the detection result.

16. The electronic device as recited in claim 9, wherein the plurality of instructions are further configured to cause the processor to:

regard the product sample image as a known product sample image, and detect the product sample image to be tested for product appearance defect detection.

17. A non-transitory storage medium having stored thereon instructions that, when executed by at least one processor of an electronic device, causes the least one processor to execute instructions of a method for detecting appearance defects of a product, the method comprising:

obtaining positive sample images, negative sample images, and product sample images;

dividing each of the product sample images into input image blocks, and inputting the input image blocks into a pre-trained autoencoder and obtaining reconstructed image blocks;

according to pixel points in each of the reconstructed image blocks, determining corresponding pixel points in each of the input image blocks, and determining corresponding pixel difference values;

generating feature connection regions of each of the input image blocks according to the positive sample images and the pixel difference values;

generating a first threshold based on image noise of the positive sample images;

selecting target regions from the feature connection regions according to a number of pixel points in each of the feature connection regions, and the first threshold;

generating a second threshold according to defective pixel points of the negative sample images;

determining a detection result of a product sample in the product sample image according to an area of the target regions and the second threshold.

18. The non-transitory storage medium as recited in claim 17, wherein the method comprising:

encoding each of the input image blocks and obtaining a feature vector of each of the input image blocks;

calculating each feature vector by an encoder of the autoencoder, and obtaining latent vectors of the input images;

inputting the latent vectors to a decoder of the autoencoder for a reconstruction processing, and obtaining the reconstructed image blocks.

19. The non-transitory storage medium as recited in claim 17, wherein the method comprising:

subtracting the pixel values of the pixel points in any two positive sample image blocks and obtaining color difference values;

counting a number of the pixel points having the same color difference value in the positive sample image blocks;

determining one color difference value as an abscissa, and determining the number of the pixel points corresponding to the color difference value as an ordinate, and generating a color difference histogram according to the abscissa and the ordinate;

selecting continuous color difference values from coordinate values of the color difference histogram according to a preset value, and determining continuous color difference values that are continuous with each other as a same feature set to obtain feature sets;

counting a number of elements in each of the feature sets, and determining one feature set having a maximum number of the elements as a target color difference value set;

selecting a maximum color difference value from the target color difference value set as a color difference threshold value;

determining the pixel difference value greater than the color difference threshold value as a target difference value, and selecting the pixel points corresponding to the target difference value from each of input image blocks, and taking the pixel points corresponding to the target difference value as target pixel points, generating the feature connection regions according to adjacent target pixel points;

determining one pixel difference value less than or equal to the color difference threshold value as background difference value, and selecting pixel points corresponding to the background difference value from each of input image blocks as background pixel points, the background pixel points being located between any two feature connection regions.

20. The non-transitory storage medium as recited in claim 19, wherein the method comprising:

determining the feature sets except the target color difference value set as background color difference value sets;

selecting the pixel points corresponding to color difference values from the positive sample image blocks and determining filtered pixel points as noise pixel points;

generating first connection regions according to adjacent noise pixel points;

counting a number of the noise pixels in each of the first connection regions, obtaining the image noise;

selecting the image noise having a largest value as the first threshold.

* * * * *